United States Patent
Keogh et al.

(10) Patent No.: US 6,191,230 B1
(45) Date of Patent: Feb. 20, 2001

(54) POLYETHYLENE CROSSLINKABLE COMPOSITION

(75) Inventors: Michael John Keogh, Pinehurst, NC (US); Jinder Jow, Somerville, NJ (US)

(73) Assignee: Union Carbide Chemicals & Plastics Technology Corporation, Danbury, CT (US)

( * ) Notice: Under 35 U.S.C. 154(b), the term of this patent shall be extended for 0 days.

(21) Appl. No.: 09/359,241

(22) Filed: Jul. 22, 1999

(51) Int. Cl.⁷ .................................................. C08F 271/02
(52) U.S. Cl. .......................... 525/263; 525/265; 525/281; 525/305; 428/374
(58) Field of Search .................................. 525/263, 265, 525/281, 305; 428/379

(56) References Cited

U.S. PATENT DOCUMENTS

| | | | |
|---|---|---|---|
| 5,272,213 | * 12/1993 | Knowles et al. | 525/305 |
| 5,272,236 | 12/1993 | Lai et al. | 526/348.5 |
| 5,278,272 | 1/1994 | Lai et al. | 526/348.5 |
| 5,849,214 | * 12/1998 | Novits et al. | 252/182.17 |
| 5,994,473 | * 11/1999 | Sempio et al. | 525/257 |

* cited by examiner

*Primary Examiner*—Bernard Lipman
(74) *Attorney, Agent, or Firm*—Saul R. Bresch

(57) ABSTRACT

A masterbatch composition comprising:
  (a) a copolymer of ethylene and 1-octene prepared with a metallocene catalyst;
  (b) as a scorch inhibitor, a substituted hydroquinone; 4,4'-thiobis(2-methyl-6-t-butylphenol); 4,4'-thiobis(2-t-butyl-5-methylphenol); or mixtures thereof;
  (c) as a cure booster, triallyl trimellitate; 3,9-divinyl-2,4,8,10-tetra-oxaspiro[5.5]undecane; triallylcyanurate; triallyl isocyanurate; or mixtures thereof; and
  (d) an organic peroxide.

10 Claims, No Drawings ed at high

POLYETHYLENE CROSSLINKABLE COMPOSITION

TECHNICAL FIELD

This invention relates to polyethylene compositions useful in the preparation of cable insulation, semiconducting shields, and jackets.

BACKGROUND OF THE INVENTION

A typical electric power cable generally comprises one or more conductors in a cable core that is surrounded by several layers of polymeric materials including a first semiconducting shield layer (conductor or strand shield), an insulating layer, a second semiconducting shield layer (insulation shield), a metallic tape or wire shield, and a protective jacket. Additional layers within this construction such as moisture impervious materials are often incorporated. Other cable constructions such as plenum and riser cable omit the shield.

In many cases, crosslinking of the polymeric materials is essential to the particular cable application, and, in order to accomplish this, useful compositions generally include a polymer; a crosslinking agent, usually an organic peroxide; and antioxidants, and, optionally, various other additives such as a scorch inhibitor or retardant and a crosslinking booster. Crosslinking assists the polymer in meeting mechanical and physical requirements such as improved thermal aging and lower deformation under pressure.

The crosslinking of polymers with free radical initiators such as organic peroxides is well known. Generally, the organic peroxide is incorporated into the polymer by melt blending in a roll mill, a biaxial screw kneading extruder, or a Banbury™ or Brabender™ mixer at a temperature lower than the onset temperature for significant decomposition of the peroxide. Peroxides are judged for decomposition based on their half life temperatures as described in Plastic Additives Handbook, Gachter et al, 1985, pages 646 to 649. An alternative method for organic peroxide incorporation into a polymeric compound is to mix liquid peroxide and pellets of the polymer in a blending device, such as a Henschel™ mixer or a soaking device such as a simple drum tumbler, which are maintained at temperatures above the freeze point of the organic peroxide and below the decomposition temperature of the organic peroxide and the melt temperature of the polymer. Following the organic peroxide incorporation, the polymer/organic peroxide blend is then, for example, introduced into an extruder where it is extruded around an electrical conductor at a temperature lower than the decomposition temperature of the organic peroxide to form a cable. The cable is then exposed to higher temperatures at which the organic peroxide decomposes to provide free radicals, which lead to the crosslinking of the polymer.

Polymers containing peroxides are vulnerable to scorch (premature crosslinking occurring during the extrusion process). Scorch causes the formation of discolored gel-like particles in the resin. Further, to achieve a high crosslink density, high levels of organic peroxide have been used. This leads to a problem known as sweat-out, which has a negative effect on the extrusion process and the cable product. Sweat-out dust is an explosion hazard, may foul filters, and can cause slippage and instability in the extrusion process. The cable product exposed to sweat-out may have surface irregularities such as lumps and pimples and voids may form in the insulation layer.

Industry is constantly seeking to find polyethylene crosslinkable compositions, which can be extruded at high temperatures (although limited by the decomposition temperature of the organic peroxide) and rates with a minimum of scorch and yet be crosslinked at a fast cure rate to a high crosslink density, all with essentially no sweat out., i.e., diffusion of the organic peroxide to the surface of the extrudate.

Further, with regard to very low density polyethylenes (VLDPEs), improvement in processing, reduction in stiffness, and better water tree growth resistance (WTGR) are sought after.

DISCLOSURE OF THE INVENTION

An object of this invention, therefore, is to provide a polyethylene composition with a scorch inhibitor, which minimizes scorch, maximizes crosslink density, and does not form crystals in the matrix which fail to melt blend on extrusion. Such a composition will be in the form of a masterbatch composition, which can be used with a wide range of VLDPEs. Other objects and advantages will become apparent hereinafter.

According to the invention, such a composition has been discovered. The masterbatch composition comprises:

(a) a copolymer of ethylene and 1-octene prepared with a metallocene catalyst;

(b) as a scorch inhibitor, a substituted hydroquinone; 4,4'-thiobis(2-methyl-6-t-butylphenol); 4,4'-thiobis(2-t-butyl-5-methylphenol); or mixtures thereof;

(c) as a cure booster, triallyl trimellitate (TATM); 3,9-divinyl-2,4,8, 10-tetra-oxaspiro[5.5]undecane (DVS); triallylcyanurate; triallyl isocyanurate; or mixtures thereof; and (d) an organic peroxide.

DESCRIPTION OF THE PREFERRED EMBODIMENT(S)

The copolymer of ethylene and 1-octene used in the masterbatch composition is a linear polymer and is prepared with a metallocene catalyst. Examples of the catalyst, the process for making the polymer, and the polymer itself can be found in U.S. Pat. Nos. 5,272,236 and 5,278,272. Other examples of metallocene catalysts, processes, and polymers are referred to in patents mentioned below. The copolymer can have a density in the range of 0.860 to 0.900 gram per centimeter; a melt index in the range of about 2 to about 35 grams per 10 minutes; and a melt flow ratio in the range of about 18 to about 170. Melt index is determined under ASTM D-1238, Condition E. It is measured at 190 degrees C. and 2160 grams. Flow index is determined under ASTM D-1238, Condition F. It is measured at 190 degrees C. at 10 times the weight used in the melt index test. Melt flow ratio is the ratio of flow index to melt index.

The masterbatch composition (MB) can be mixed with a VLDPE in any proportions; however, a suggested ratio, by weight, for MB:VLDPE is about 0.1:1 to about 0.8:1, and is preferably in the range of about 0.15:1 to about 0.4:1.

The VLDPE with which the masterbatch composition can be mixed can be a copolymer of ethylene and one or more alpha-olefins having 3 to 12 carbon atoms and preferably 3 to 8 carbon atoms. Examples of the alpha-olefins are propylene, 1-butene, 1-hexene, 4-methyl-1-pentene, and 1-octene. It is noted that the masterbatch polymer can be a VLDPE. The density of the VLDPE can be in the range of 0.860 to 0.915 gram per cubic centimeter. The melt index of the VLDPE can be in the range of about 0.1 to about 20 grams per 10 minutes and is preferably in the range of about 0.3 to about 5 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The VLDPE can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight.

The VLDPEs are produced by low pressure processes. They are preferably produced in the gas phase, but they can also be produced in the liquid phase in solutions or slurries by conventional techniques. Low pressure processes are typically run at pressures below 1000 psi.

Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. Nos. 4,508,842 (heterogeneous polyethylenes) and 5,332,793; 5,342,907; and 5,410,003 (homogeneous polyethylenes); a chromium based catalyst system such as that described in U.S. Pat. No. 4,101,445; a metallocene catalyst system such as that described in United States Pat. Nos. 4,937,299 and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents.

The scorch inhibitor is a substituted hydroquinone; 4,4'-thiobis(2-methyl-6-t-butylphenol); 4,4'-thiobis(2-t-butyl-5-methylphenol); or mixtures thereof The hydroquinone can be substituted at the 2 position with a tertiary alkyl group or at the 2 and 5 positions with the same or different tertiary alkyl groups. The alkyl group can have 1 to 18 carbon atoms. Examples are tertiary butyl and tertiary amyl. Substituted hydroquinones are described in U.S. Pat. No. 5,292,791.

The cure (crosslinking) booster can be triallyl trimellitate (TATM); 3,9-divinyl-2,4,8,10-tetra-oxaspiro [5.5]undecane (DVS); triallylcyanurate; triallyl isocyanurate; or mixtures thereof.

The organic peroxide preferably has a one hour half life decomposition temperature measured in benzene of about 125 to about 150 degrees C. and can be exemplified by the following compounds [the numbers set off by the parentheses are their one hour half life decomposition temperatures (in degrees C)]: t-butyl peroxy benzoate (125); dicumyl peroxide (135); alpha, alpha'-bis-t-butylperoxy- 1,4-diisopropylbenzene (137); 2,5-dimethyl-2,5-di(t-butyl-peroxy)hexane (138); t-butyl cumyl peroxide (138); t-butyl hydroperoxide (140); di-t-butyl peroxide (149); and 2,5-dimethyl-2,5-di(t-butyl peroxy)hexane-3 (149). Alpha, alpha'-bis-t-butylperoxy-1,4-diisopropylbenzene is preferred.

The masterbatch manufacturing process allows for compounding below the threshold temperature for peroxide decomposition or provides for the soaking of the peroxide into the compounded pre-masterbatch.

Based on 100 parts by weight of the copolymer, the proportions of the compounds in the masterbatch composition can be about as follows (in parts by weight):

| Component | Broad Range | Preferred Range |
| --- | --- | --- |
| (b) scorch inhibitor | 0.03 to 4.5 | 0.05 to 3 |
| (c) cure booster | 0.1 to 9 | 0.25 to 6 |
| (d) organic peroxide | 0.4 to 27 | 0.6 to 14 |

In the final composition, the proportions, based on 100 parts by weight of the copolymer, can be as follows:

| | |
| --- | --- |
| (b) scorch inhibitor | 0.03 to 0.5 |
| (c) cure booster | 0.1 to 1 |
| (d) organic peroxide | 0.4 to 3 |

It should be understood that these proportions can vary outside of the stated ranges depending on the desired properties. For example, to achieve a low dissipation factor in wire and cable applications, the amount of cure booster can be lowered and the amount of peroxide raised. Variations can also be considered for other properties such as heat aging characteristics and tensile properties. The weight ratio of scorch inhibitor to cure booster can be in the range of about 0.03:1 to about 5:1, and is preferably in the range of about 0.07:1 to about 1.2:1.

Examples of the compounded masterbatch compositions both before and after addition of the peroxide are as follows (in percent by weight):

| | | |
| --- | --- | --- |
| ethylene/1-octene copolymer | 92 | 80 |
| 2,5-di-tert-butylhydroquinone | 0.5 | 0.5 |
| triallyltrimellitate | 4.0 | 4.0 |
| primary antioxidant | 1.5 | 1.5 |
| secondary antioxidant | 2.0 | 2.0 |
| alpha, alpha'-bis-t-butylperoxy-1,4-diisopropylbenzene | — | 12.0 |

Note: the use of other peroxides than alpha, alpha'-bis-t-butylperoxy-1,4-diisopropylbenzene in these masterbatch compositions will require an adjustment in the amount of scorch inhibitor and/or cure booster.

The composition of the invention can be processed in various types of extruders, e.g., single or twin screw types. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. For the purposes of this specification, it will be understood that the term "extruder" includes, in addition to conventional extruders, the combination of an extruder, crosshead, die, and a heating or cooling zone where a further forming of the material can be accomplished. The heating or cooling follows the die and may be, for example, an oven. In wire coating, where the material is crosslinked after extrusion, the die of the crosshead feeds directly into a heating zone, and this zone can be maintained at a temperature in the range of about 130 to about 260 degrees C., and preferably in the range of about 170 to about 220 degrees C.

The extrudate is then crosslinked by exposing it to a temperature greater than the decomposition temperature of the organic peroxide. Preferably, the peroxide employed is decomposed through four or more half-lives. The crosslinking can be accomplished in, for example, an oven or a continuous vulcanizable (CV) tube. With steam CV equipment, a pressure rated vulcanizing tube is mechanically coupled to the extruder crosshead such that the polymer melt exits the crosshead/die assembly into a vulcanizing pipe running perpendicular to the extruder. In a typical CV operation, compositions incorporating peroxides are extrusion fabricated into insulation and cable jacketing at low melt extrusion temperatures to avoid premature crosslinking in the extruder. The fabricated melt shape exits the shaping die into the steam vulcanizing tube where post extrusion peroxide initiated crosslinking occurs. The steam tube is filled with saturated steam which continues to heat the polyolefin melt to the increased temperatures needed for crosslinking. Most of the CV tube is filled with saturated steam to maximize dwell time for crosslinking to occur. The final length before exiting the tube is filled with water to cool the now crosslinked insulation/jacketing. At the end of the CV tube, the insulated wire or cable passes through an end seal incorporating close fitting gaskets, which minimize the cooling water leakage. Steam regulators, water pumps, and valvings maintain equilibrium of the steam and water and the respective fill lengths within the steam CV tube. Alternatively, a hot nitrogen gas CV tube may be used to cure the cable construction.

Conventional additives can be added to the polymer either before or during processing. The amount of additive is usually in the range of about 0.01 to about 50 percent by weight based on the weight of the resin. Useful additives are antioxidants, ultraviolet absorbers, antistatic agents, pigments, carbon black, dyes, fillers, slip agents, fire retardants, plasticizers, processing aids, lubricants, stabilizers, smoke inhibitors, halogen scavengers, flow aids, lubricants, water tree inhibitors such as polyethylene glycol, and viscosity control agents.

In order to provide a semiconducting shield it is necessary to incorporate conductive particles into the composition. These conductive particles are generally provided by particulate carbon black. Useful carbon blacks can have a surface area of about 50 to about 1000 square meters per gram. The surface area is determined under ASTM D 4820-93a (Multipoint B.E.T. Nitrogen Adsorption). The carbon black is used in the semiconducting shield composition in an amount of about 20 to about 60 percent by weight based on the weight of the composition, and is preferably used in an amount of about 25 to about 45 percent by weight. Examples of conductive carbon blacks are the grades described by ASTM N550, N472, N351, and N110, and acetylene black.

Examples of antioxidants are: hindered phenols such as tetrakis [methylene(3,5-di-tert- butyl-4-hydroxyhydrocinnamate)]methane, bis [(beta-(3,5-ditert-butyl-4-hydroxybenzyl)-methylcarboxyethyl)]sulphide, and thiodiethylene bis(3,5-di-tert-butyl-4-hydroxy hydrocinnamate); phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate (DSTDP); various siloxanes; and various amines such as polymerized 2,2,4-trimethyl-1,2-dihydroquinoline, 4,4'-bis(alpha, alpha-dimethylbenzyl)diphenylamine, and alkylated diphenylamines. Antioxidants can be used in amounts of about 0.1 to about 5 percent by weight based on the weight of the composition. Generally, lower amounts can be used because the scorch inhibitors, which are in the composition of the invention, are excellent process and heat stabilizers.

A preferred primary antioxidant is thiodiethylene bis(3, 5-di-tert-butyl-4-hydroxy hydrocinnamate). Preferred secondary antioxidants are distearylthiodipropionate (DSTDP); dilaurylthiodipropionate (DLTDP); and distearyldisulfide.

Advantages of the invention are low scorch, higher useful extrusion temperatures, high crosslink density, less molecular weight degradation of copolymer, less dusting of resin due to reduced peroxide sweat out, and, under suitable circumstances, higher throughput of wire or cable through the continuous vulcanizing oven. A key advantage is the relatively good compatibility of the scorch inhibitors with the resin and its low melting point resulting in extrusion melt blending with no contaminating crystals in the product. Processing is also improved along with flexibility and WTGR.

Scorch is usually given in terms of scorch time determined by moving die rheometer (MDR) manufactured by Alpha Technologies and is operated using a 0.5 degree rotation arc under a specified temperature. Scorch time (min) can also be referred to as MDR TS1at a given temperature (such as 150 degrees C.). The TS1 represents the time, in minutes, for a rise of 1.0 inch-pound of torque over the minimum torque. The value is representative of the material's propensity to scorch.

At least three methods exist for quantifying the degree of crosslinking of the resin: (i) by "hot-set" ( IEC 502/540). This is accomplished by attaching a weight, which provides a stress of 29 psi (0.20 MPa), to the crosslinked composition in plaque form at 200 degrees C. If the elongation is no greater than 100 percent, the crosslink density is sufficient for industrial purposes. (ii) by decalin extractables (ASTM D 2765). The uncrosslinked polymer dissolves in the hot decalin solvent and the value is reported in percent by weight decalin extractables. A value below 30 percent and preferably less than 20 percent is judged to be acceptable. (iii) by rheometer, which checks the viscosity. The rheometer test procedure is described in U.S Pat. No. 3,954,907. The first two methods are industry standards. The third method is a diagnostic tool particularly suitable for accurate screening and laboratory study.

The higher the extrusion temperature, the hotter the resin composition going into the CV tube to be crosslinked and, thus, the faster the cure rate, simply because the resin composition doesn't have to be heated up as much for the cure step. The maximum extrusion temperature relates to the decomposition temperature of the organic peroxide, i.e., the extrusion temperature cannot be as high as the temperature at which significant decomposition of the peroxide takes place. Thus, it is advantageous to be able to use an organic peroxide having a higher decomposition temperature if the other components of the composition of the invention will tolerate a higher extrusion temperature.

In certain polyethylene compositions, 4,4'-thiobis(2-methyl-6-t-butyl phenol) has been found to cause a color problem, which, in spite of its scorch inhibitor qualities can be commercially unacceptable. This problem is solved by adding hydroquinone or a substituted hydroquinone in a sufficient amount to inhibit color formation.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above.

All molecular weights mentioned in this specification are weight average molecular weights unless otherwise designated.

The patents and publication mentioned in this specification are incorporated by reference herein.

The invention is illustrated by the following examples.

EXAMPLES

Examples of compounded masterbatch compositions before and after compounding with 80 percent VLDPE by weight are as follows (in percent by weight). See Table I.

TABLE I

|  | Masterbatch | Final Composition |
|---|---|---|
| VLDPE Masterbatch |  | 80 |
| ethylene/1-octene copolymer | 100 | 17.68 |
| scorch inhibitor: 2,5-di-tert-butyl hydroquinone | 0.14 | 0.03 |
| cure booster: triallylcyanurate | 1.70 | 0.30 |
| peroxide: alpha, alpha'-bis-t-butylperoxy-1,4-diisopropylbenzene | 8.71 | 1.54 |
| primary antioxidant | 1.41 | 0.25 |
| secondary antioxidant | 1.13 | 0.20 |

Examples of masterbatch after compounding with 80 percent VLDPE by weight and control (in percent by weight), and results are as follows. See Table II.

TABLE II

|  | Final Composition | Control |
|---|---|---|
| HP-LDPE |  | 100 |
| VLDPE Masterbatch | 80 |  |
|  | 20 |  |
| Properties |  |  |
| 200 C. Hot Set | 61 percent | 61 percent |
| 150 C. MDR, Ts1 | 20.0 minutes | 20.0 minutes |

TABLE II-continued

|  | Final Composition | Control |
|---|---|---|
| Flexural modulus | 10,880 psi | 23,500 psi |

Notes to Tables:
1. VLDPE=a very low density polyethylene, which is a copolymer of ethylene and 1-butene having a density of 0.905 gram per cubic centimeter and a melt index of 4 grams per 10 minutes.
2. ethylenel1-octene copolymer=a copolymer having a density of 0.868 gram per cubic centimeter and a melt index of 28 grams per 10 minutes prepared with a metallocene catalyst.
3. primary antioxidant=thiodiethylene bis(3,5-di-tert-butyl-4-hydroxy hydrocinnamate)
4. secondary antioxidant=distearylthiodipropionate (DSTDP)
5. HP-LDPE=a low density homopolymer of ethylene having a density of 0.920 gram per cubic centimeter and a melt index of 2.0 grams per 10 minutes.
6. 200 C. Hot Set=elongation, in percent, of the crosslinked plaque at 200 degrees C. tested per IEC 502/540 hot set test method
7. 150 C. MDR, Ts1=scorch time (min), in minutes, for a rise of 1.0 inch-pound of torque over the minimum torque determined by a moving die rheometer manufactured by Alpha Technologies and operated using a 0.5 degree rotation arc. and 150° C.
8. Flexural modulus=tangent modulus of elasticity, in psi, by test method I under by ASTM D790

The above example of VLDPE with masterbatch shows equivalent cure by 200 C. Hot Set and scorch resistance by Ts1 at 150 C. MDR, but better flexibility than control material.

What is claimed is:
1. A masterbatch composition comprising:
   (a) a copolymer of ethylene and 1-octene prepared with a metallocene catalyst;
   (b) as a scorch inhibitor, a substituted hydroquinone; 4,4'-thiobis(2-methyl-6-t-butylphenol); 4, 4'-thiobis(2-t-butyl-5-methylphenol); or mixtures thereof;
   (c) as a cure booster, triallyl trimellitate; 3,9-divinyl-2,4,8,10-tetra-oxaspiro[5.5]undecane; triallylcyanurate; triallyl isocyanurate; or mixtures thereof; and
   (d) an organic peroxide.
2. The composition defined in claim 1 wherein the scorch inhibitor is present in an amount of about 0.03 to about 4.5 parts by weight based on 100 parts by weight of component (a).
3. The composition defined in claim 1 wherein the cure booster is present in an amount of about 0.1 to about 9 parts by weight based on 100 parts by weight of component (a).
4. The composition defined in claim 1 wherein the organic peroxide is present in an amount of about 0.4 to about 27 parts by weight based on 100 parts by weight of component (a).
5. The composition defined in claim 1 wherein the weight ratio of scorch inhibitor to cure booster, if used, is in the range of about 0.03:1 to about 5:1.
6. A mixture of the composition defined in claim 1 and very low density polyethylene in any proportions.
7. The composition defined in claim 1 wherein the following components are present as follows:

(b) about 0.03 to about 0.5 part by weight of scorch inhibitor;

(c) about 0.1 to about 1.0 part by weight of cure booster; and (d) about 0.4 to about 3 parts by weight of organic peroxide.

8. A cable comprising one or more electrical conductors or a core of electrical conductors, each conductor or core being surrounded by a composition comprising:
   (a) a crosslinked very low density polyethylene having a density in the range of 0.860 to 0.915 gram per cubic centimeter;
   (b) a crosslinked copolymer of ethylene and 1-octene prepared with a metallocene catalyst;
   (c) as a scorch inhibitor, a substituted hydroquinone; 4,4'-thiobis(2-methyl-6-t-butylphenol); 4,4'-thiobis(2-t-butyl-5-methylphenol); or mixtures thereof; and
   (d) as a cure booster, triallyl trimellitate; 3,9-divinyl-2,4,8,10-tetra-oxaspiro[5.5]undecane; triallylcyanurate; triallyl isocyanurate; or mixtures thereof.

9. The cable defined in claim 8 wherein, for each 100 parts by weight of components (a) and (b), combined, there are about 0.03 to 0.5 part by weight of component (c) and about 0.1 to about 1 part by weight of component (d).

10. A process for extrusion comprising extruding around one or more electrical conductors or a core of electrical conductors, at a temperature below the decomposition temperature of the organic peroxide, a composition comprising
   (a) a very low density polyethylene having a density in the range of 0.860 to 0.915 gram per cubic centimeter;
   (b) a copolymer of ethylene and 1-octene prepared with a metallocene catalyst;
   (c) as a scorch inhibitor, a substituted hydroquinone; 4,4'-thiobis(2-methyl-6-t-butylphenol); 4,4'-thiobis(2-t-butyl-5-methylphenol); or mixtures thereof, and
   (d) as a cure booster, triallyl trimellitate; 3,9-divinyl-2,4,8,10-tetra-oxaspiro[5.5]undecane; triallylcyanurate; triallyl isocyanurate; or mixtures thereof; and
   (e) an organic peroxide; and curing the extrudate.

* * * * *